No. 855,534. PATENTED JUNE 4, 1907.
A. SMITH.
HORSESHOE CALK.
APPLICATION FILED OCT. 26, 1904.
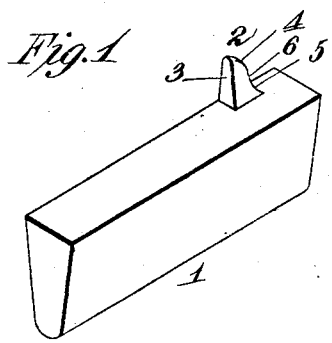
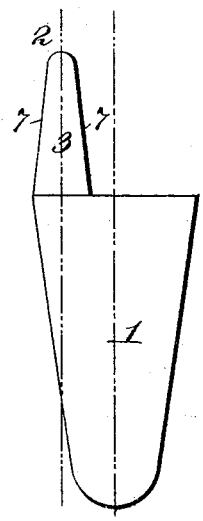
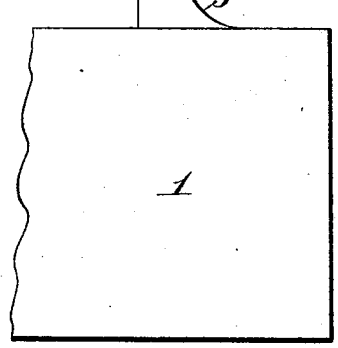
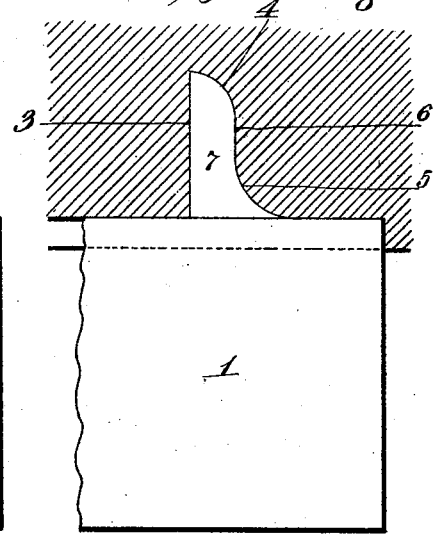
Witnesses:
Jas. F. Coleman
John S. Totsch
Inventor
Arthur Smith
By Dyer & Dyer
Attorneys.

UNITED STATES PATENT OFFICE.

ARTHUR SMITH, OF EASTON, PENNSYLVANIA, ASSIGNOR TO AMERICAN HORSE SHOE COMPANY, OF PHILLIPSBURG, NEW JERSEY, A CORPORATION OF NEW JERSEY.

HORSESHOE-CALK.

No. 855,534.　　　　Specification of Letters Patent.　　　　Patented June 4, 1907.

Application filed October 26, 1904. Serial No. 230,004.

*To all whom it may concern:*

Be it known that I, ARTHUR SMITH, a citizen of the United States, residing at Easton, in the county of Northampton, State of Pennsylvaina, have invented certain new and useful Improvements in Horseshoe-Calks, of which the following is a specification.

The object I have in view is to produce a calk which may be readily welded to horseshoes of the ordinary type, without danger of the calk separating from the shoe, while the two are being heated to raise them to a welding temperature. I attain these objects by the device illustrated in the accompanying drawings, in which, Figure 1 is a perspective view of a calk embodying my invention. Fig. 2 is an enlarged end view of the same. Fig. 3 is a fragmental elevation; and Fig. 4 is a similar view showing the metal of the horseshoe in section, the calk being welded in place.

In all of the several views like parts are indicated by the same reference numerals.

In carrying out my invention, I provide a calk 1 of the customary shape as shown provided with a spur 2. This spur is ordinarily formed integral with the calk, adjacent to one edge, and near one end, but the location and number of spurs used is immaterial. The spur is of the shape shown in Figs. 2 and 3. One of the sides 3, at right angles to the longitudinal axis of the calk, is straight. The other side is formed in the shape of a double reversed curve, having the upper curved part 4 and lower curved part 5 connected by the straight portion 6. The straight portion 6 is substantially parallel to the side 3, and forms a means whereby the spur is securely retained within the metal of the shoe. The sides 7—7 of the spur converge as shown in Fig. 2 producing an object which viewed from the and of the calk is of tapering cross section. The vertical axis of the spur is preferably parallel to the similar axis of the calk, as shown in Fig. 2.

In use the horseshoe being heated to a red heat, the calk is applied thereto in a cold state, the spur being driven into the shoe and holding it firmly in place. The shoe and calk are now brought to a welding temperature and the parts welded together. The shape of the spur, particularly the feature of the parallel sides 3 and 6 prevent accidental displacement of the calk. The curved side 4 is for the purpose of giving the spur a sharp point to permit it to be driven into the shoe, while the curved side 5 at the base of the spur gives it the necessary metal to impart to it the desired rigidity.

Having now described my invention, what I claim as new and desire to secure by Letters Patent, is:—

As a new article of manufacture, a horseshoe calk having an integral spur thereon, the said spur having the following characteristics: one of the sides at right angles to the longitudinal axis of the calk is straight and at ninety degrees from the body of the calk, the opposite side is formed in the shape of a double reversed curve, having an upper curved part and a lower curved part connected by a straight portion, which is substantially parallel to the first side, forming a means whereby the spur is securely retained within the metal of the shoe, the two sides parallel to the longitudinal axis of the calk converging, producing an object which, viewed from the end of the calk, is of tapering cross-section, and the upper curved part giving the spur a sharp point permitting it to be driven into the shoe, and the lower curved part giving the spur the necessary metal to impart to it the desired rigidity.

This specification signed and witnessed this 3rd day of October, 1904.

ARTHUR SMITH.

Witnesses:
　CHAS. B. BRUNNER,
　JOHN R. CHIDSEY.